(12) United States Patent
Iwasaki et al.

(10) Patent No.: US 6,185,368 B1
(45) Date of Patent: *Feb. 6, 2001

(54) REDUNDANT DISK ARRAY WITH REAL-TIME LOST DATA RECONSTRUCTION

(75) Inventors: Yasuo Iwasaki; Hiroyuki Miyawaki, both of Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/898,509

(22) Filed: Jul. 22, 1997

(30) Foreign Application Priority Data

Jul. 29, 1996 (JP) .................................................. 8-216118

(51) Int. Cl.[7] .................................................. H04N 5/781
(52) U.S. Cl. .......................... 386/125; 386/126; 386/46; 714/7; 348/7; 348/13
(58) Field of Search ............................... 386/45–46, 109, 386/125–126, 111, 124, 131, 112; 711/114; 395/182.05, 182.04; 348/7, 12–15, 6; 714/6, 764, 7; H04N 5/781

(56) References Cited

U.S. PATENT DOCUMENTS

| | | | |
|---|---|---|---|
| 5,148,432 | * | 9/1992 | Gorden et al. .......................... 714/7 |
| 5,414,455 | * | 5/1995 | Hooper et al. .......................... 348/7 |
| 5,623,595 | * | 4/1997 | Bailey .................................... 714/6 |
| 5,754,730 | * | 5/1998 | Windrem et al. ..................... 386/125 |
| 5,758,057 | * | 5/1998 | Baba et al. ............................. 714/7 |
| 5,862,403 | * | 1/1999 | Kanai et al. ........................... 710/6 |
| 5,899,582 | * | 5/1999 | DuLac ................................. 386/125 |
| 6,055,354 | * | 4/2000 | Bopardikar ............................ 386/46 |

FOREIGN PATENT DOCUMENTS 2 278 228 * 11/1994 (GB) ............................. G11B/20/18

* cited by examiner

Primary Examiner—Wendy Garber
Assistant Examiner—Vincent F. Baccio
(74) Attorney, Agent, or Firm—Frommer Lawrence & Haug, LLP.; William S. Frommer (57) ABSTRACT

A data recording/reproducing apparatus for recording and reproducing data to and from a plurality of record mediums that are non-linearly accessible is disclosed, that comprises a recording/reproducing portion for recording and reproducing data to the record mediums, and a controlling portion for controlling the recording/reproducing portion, wherein when the controlling portion detects that data recorded on one of the record mediums is not reproduced, the controlling portion detects a blank time period for which a host system has not accessed the data recording/reproducing apparatus, causes the recording/reproducing portion to reproduce the data from reproducible record mediums in the blank time period and error correction data recorded on another record medium, and re-structures data that is not reproduced with data that is reproduced from the reproducible record mediums and the error correction data.

48 Claims, 9 Drawing Sheets

Fig. 2

| D1 | 0 | 0 | 0 | 0 | 0 | 0 | 0 | 0 | 1 | 1 | 1 | 1 | 1 | 1 | 1 | 1 |
|----|---|---|---|---|---|---|---|---|---|---|---|---|---|---|---|---|
| D2 | 0 | 0 | 0 | 0 | 1 | 1 | 1 | 1 | 0 | 0 | 0 | 0 | 1 | 1 | 1 | 1 |
| D3 | 0 | 0 | 1 | 1 | 0 | 0 | 1 | 1 | 0 | 0 | 1 | 1 | 0 | 0 | 1 | 1 |
| D4 | 0 | 1 | 0 | 1 | 0 | 1 | 0 | 1 | 0 | 1 | 0 | 1 | 0 | 1 | 0 | 1 |
| DP | 1 | 0 | 0 | 1 | 0 | 1 | 1 | 0 | 0 | 1 | 1 | 0 | 1 | 0 | 0 | 1 |

Fig. 3

| D1 | 0 | 0 | 0 | 0 | 0 | 0 | 0 | 0 | 1 | 1 | 1 | 1 | 1 | 1 | 1 | 1 |
|----|---|---|---|---|---|---|---|---|---|---|---|---|---|---|---|---|
| D2 | 0 | 0 | 0 | 0 | 1 | 1 | 1 | 1 | 0 | 0 | 0 | 0 | 1 | 1 | 1 | 1 |
| DP | 1 | 0 | 0 | 1 | 0 | 1 | 1 | 0 | 0 | 1 | 1 | 0 | 1 | 0 | 0 | 1 |
| D4 | 0 | 1 | 0 | 1 | 0 | 1 | 0 | 1 | 0 | 1 | 0 | 1 | 0 | 1 | 0 | 1 |
| D3 | 0 | 0 | 1 | 1 | 0 | 0 | 1 | 1 | 0 | 0 | 1 | 1 | 0 | 0 | 1 | 1 |

REDUNDANT DISK ARRAY WITH REAL-TIME LOST DATA RECONSTRUCTION

BACKGROUND OF THE INVENTION

1. Field of the Invention

The present invention relates to a data recording/reproducing apparatus and a method thereof, in particular, to a data recording/reproducing apparatus for securing the continuity of data and a method thereof.

2. Description of the Related Art

In recent years, apparatuses that record and reproduce picture/sound data to and from a randomly accessible record/reproduction medium instead of a sequentially accessible record/reproduction medium such as a tape are becoming common.

In a picture recording/reproducing apparatus that records and reproduces picture data in a high quality, the data transmission rate should be high and a large storage capacity is required to record picture data for a ling time. Thus, a plurality of hard disks are operated in parallel for a high transmission rate. In addition, parity data is recorded so that even if one of hard disks gets defective, original data can be restored (re-structured). Thus, the reliability of the picture recording/reproducing apparatus is improved.

Figure 1:
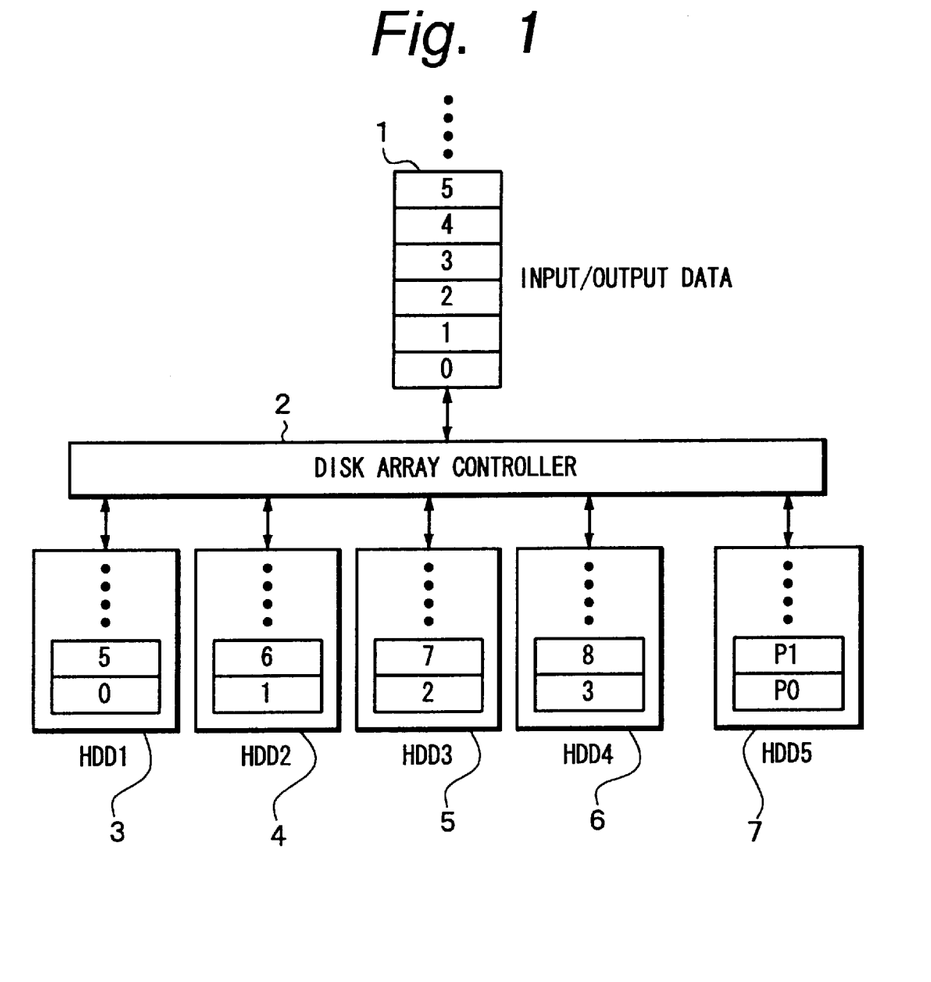
FIG. 1 is a schematic diagram showing the structure of a conventional disk array unit.

Such a picture recording/reproducing apparatus is referred to as a disk array unit. Such a disk array unit is described in "A Case for Redundant Arrays of Inexpensive Disks (RAID)," ACM SIGMOD, Conference, Chicago, Ill., June, 1988. Referring to the paper, disk array units are referred to as RAIDs. RAIDs are categorized as RAID 1 to RAID 5. FIG. 1 shows a disk array unit corresponding to RAID 3. Referring to FIG. 1, data with a predetermined bit width such as eight bits or 16 bits is supplied to a disk array controller 2. A plurality of hard disks 3, 4, 5, 6, and 7 (in this example, five hard disks) are connected to the disk array controller 2. The hard disks 3, 4, 5, and 6 are used to record data. The disk array controller 2 assign data to the hard disks 3, 4, 5, and 6. On the other hand, the hard disk 7 is used to record only parity data calculated corresponding to input data.

Figure 2:
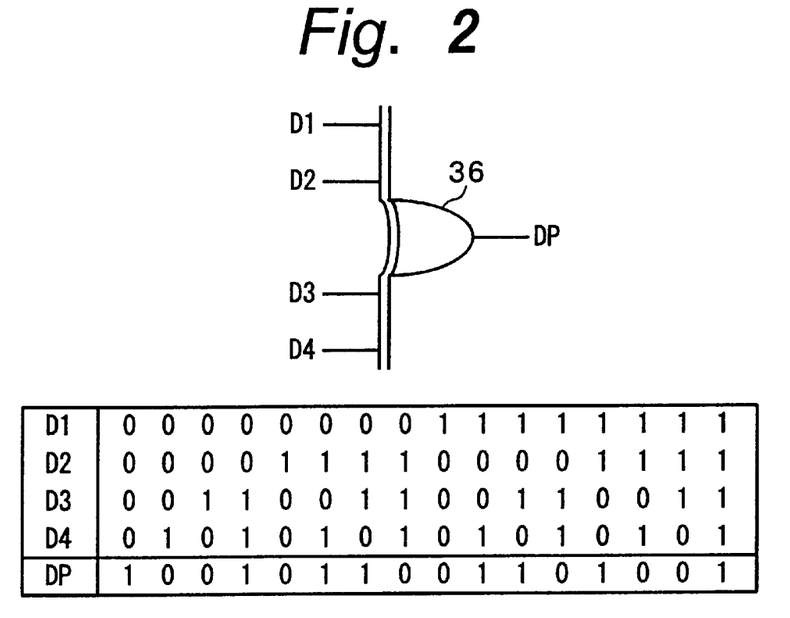
FIG. 2 is a schematic diagram for explaining a parity generating operation.

FIG. 2 is a schematic diagram for explaining a generating operation of parity data for example odd parity data. Four data D1, D2, D3, and D4 are supplied to an exclusive OR gate 36. The exclusive OR gate 36 generates parity data DP. In other words, the parity data DP is generated in such a manner that the number of "1s" of each bit of the data D1, D2, D3, and D4 is an odd number. The data D1 to D4 are data recorded on the hard disks 3, 4, 5, and 6, respectively. The parity data DP is recorded on the hard disk 7 of the disk array unit shown in FIG. 1.

Figure 3:
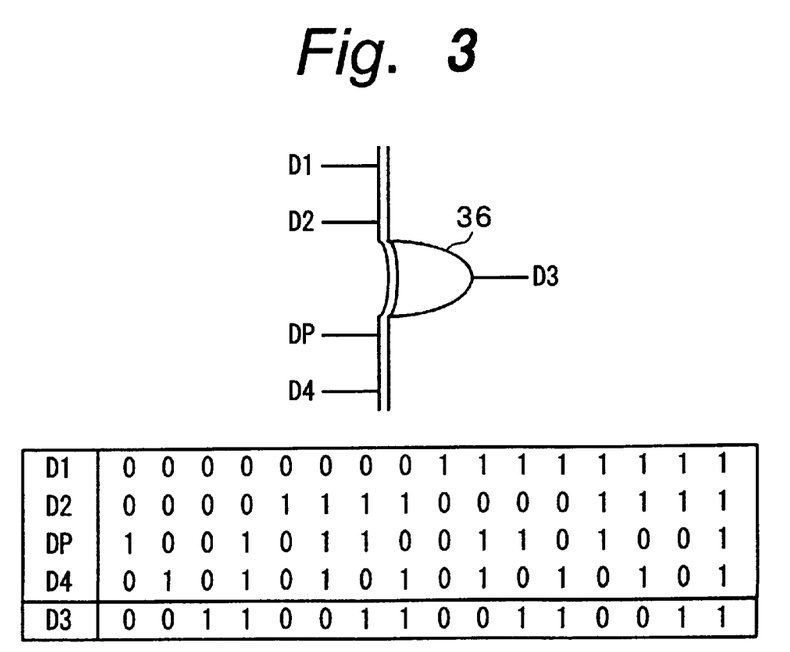
FIG. 3 is a schematic diagram showing a restoring operation of original data with parity data.

If any hard disk gets defective, by calculating the remaining data and the parity data DP, the data recorded on the defective hard disk can be restored. Thus, when the restored data is re-recorded on a substitute one of the defective hard disk, data can be re-structured. Normally, the defective hard disk is substituted with a new one. For example, as shown in FIG. 3, if the data D4 (recorded on a hard disk 3) of the data D1 to D4 becomes error data, when the data D3 is detected as error data, by inputting the normal data D1, D2, and D4 and the party data DP to the exclusive OR gate 36, the original data D3 can be restored. When the hard disks 3, 4, 5, 6, and 7 perform an error correction operation with error correction code and an uncorrectable error takes place, the error is corrected with the above-described parity data.

In the case that such a picture/sound data recording apparatus is used for a broadcast operation, when an input picture data contains a D2 base band signal, a transmission rate of around 120 Mbps is required. Assuming that the effective transmission rate of each hard disk is around 30 Mbps, four hard disks are required in each disk array unit. For example, when six channels are required, 24 hard disks are required.

The effective transmission rate is obtained by dividing an amount of data by a total time period necessary for reading/writing the data. Thus, the effective transmission rate is not the transmission rate of each hard disk or an instantaneous transmission rate of an interface portion. In addition, it is assumed that a plurality of pictures or the same picture is reproduced or recorded from/to the same recording/reproducing apparatus through individual channels.

However, it is not practical to operate as many as 24 hard disks in parallel at a time. In other words, when many hard disks are operated at a time, the management side that issues commands and manages these hard disks is excessively loaded. Thus, it takes a time for the management side to control the hard disks. Consequently, the effective transmission rate decreases, thereby deteriorating the reliability against a defect. Conventionally, to solve such a problem, a plurality of disk array units are operated in parallel and thereby the transmission rate is increased.

However, in a picture recording/reproducing apparatus with conventional disk array units, even if one of hard disks gets defective and thereby data should be re-structured, when a required amount of data is not supplied to the user (namely, when an operation that causes the transmission rate to extremely decreases is performed), the data stops and thereby the reproduction of picture data and sound data stops. From this point of view, data cannot be freely re-structure.

On the other hand, in the case that data can be re-structured by the user at a sacrifice of the performance, until the re-structuring operation is performed, the apparatus is operated without redundancy.

Generally, a hard disk uses a SCSI interface. With the SCSI interface, when a command for reproducing or recoding data from or to a hard disk is sent to a hard disk, it takes a time to send a new command for stopping the current operation or performing the next operation. In other words, in the system of which the disk array unit automatically starts the re-structuring operation and the disk array unit forcedly stops the re-structuring operation and reproduces or records the requested data when it receives a command from the user, it takes a long time for the disk array unit to start an operation after receiving a command. In this method, the continuity of data cannot be secured. Consequently, moving picture data or sound data may not be continuously reproduced.

In a system that predicts a delay for a real operation, to continuously reproduce moving picture data and sound data, a memory for storing extra data and a controlling circuit therefor are required, thereby raising the cost.

When a data (such as picture data and/or sound data) recording/reproducing apparatus has a disk array unit that re-structures data for securing the reliability, if part of data should be re-structured due to a defect of a hard disk, the redundancy cannot be restored without a sacrifice of part of the function.

OBJECTS AND SUMMARY OF THE INVENTION

An object of the present invention is to provide a data recording/reproducing apparatus for allowing data of a defective hard disk to be re-structured corresponding to a data record/reproduction request without a sacrifice of the performance.

A first aspect of the present invention is a data recording/reproducing apparatus for recording and reproducing data to and from a plurality of record mediums that are non-linearly accessible, comprising a recording/reproducing portion for recording and reproducing data to the record mediums, and a controlling portion for controlling the recording/reproducing portion, wherein when the controlling portion detects that data recorded on one of the record mediums is not reproduced, the controlling portion detects a blank time period for which a host system has not accessed the data recording/reproducing apparatus, causes the recording/reproducing portion to reproduce the data from reproducible record mediums in the blank time period and error correction data recorded on another record medium, and re-structures data that is not reproduced with data that is reproduced from the reproducible record mediums and the error correction data.

A second aspect of the present invention is a data recording/reproducing apparatus for recording and reproducing data to and from a plurality of record mediums that are non-linearly accessible, comprising a system management controlling portion communicable with a host system, a recording/reproducing portion for recording and reproducing data to and from the record mediums, a plurality of data controlling portions, disposed corresponding to a predetermined unit of data, for sending the unit of data to the recording/reproducing portion in time slots of which a predetermined time period is divided into a plurality of portions and receiving data from the recording/reproducing portion, and a controlling portion for controlling the recording/reproducing portion, wherein when the controlling portion detects that data recorded on one of the record mediums is not reproduced, the controlling portion causes the recording/reproducing portion to reproduce data and error correction data from reproducible record mediums in the time slots assigned by the system management controlling portion and re-structures data that is not reproduced with data that is reproduced from the reproducible record mediums and the error correction data.

A third aspect of the present invention is a data recording/reproducing apparatus for recording and reproducing data to and from a plurality of record mediums that are non-linearly accessible, comprising a recording/reproducing portion for recording and reproducing data to and from the record mediums, a plurality of data controlling portions, disposed corresponding to a predetermined unit of data, for sending the unit of data to the recording/reproducing portion in time slots of which a predetermined time period is divided into a plurality of portions and receiving data from the recording/reproducing portion, and a controlling portion for controlling the recording/reproducing portion, wherein when the controlling portion detects that data recorded on one of the record mediums is not reproduced, the controlling portion causes the recording/reproducing portion to reproduce data and error correction data from reproducible record mediums in a remaining time period of the time slots after the data controlling portion has completed a record control or a reproduction control to or from the record mediums and re-structures data that is not reproduced with data that is reproduced from the reproducible record mediums and the error correction data.

A fourth aspect of the present invention is a data recording/reproducing apparatus for recording and reproducing data to and from a plurality of record mediums that are non-linearly accessible, comprising a recording/reproducing portion for recording and reproducing data to and from the record mediums, a plurality of data controlling portions, disposed corresponding to a predetermined unit of data, for sending the unit of data to the recording/reproducing portion in time slots of which a predetermined time period is divided into a plurality of portions and receiving data from the recording/reproducing portion, and a controlling portion for controlling the recording/reproducing portion, wherein when the controlling portion detects that data recorded on one of the record mediums is not reproduced and that data received from the data controlling portions is not supplied to the recording/reproducing portion, the controlling portion causes the recording/reproducing portion to reproduce data and error correction data from reproducible record mediums in the time slots assigned and re-structures data that is not reproduced with data that is reproduced from the reproducible record mediums and the error correction data.

A fifth aspect of the present invention is a data recording/reproducing method for recording and reproducing data to and from a plurality of record mediums that are non-linearly accessible, comprising the steps of (a) causing a recording/reproducing portion to record and reproduce data to the record mediums, and (b) controlling the recording/reproducing portion, wherein when it is detected that data recorded on one of the record mediums is not reproduced, the step (b) is performed by controlling portion detects a blank time period for which a host system has not accessed the data recording/reproducing apparatus, causing the recording/reproducing portion to reproduce the data from reproducible record mediums in the blank time period and error correction data recorded on another record medium, and re-structuring data that is not reproduced with data that is reproduced from the reproducible record mediums and the error correction data.

A sixth aspect of the present invention is a data recording/reproducing method for recording and reproducing data to and from a plurality of record mediums that are non-linearly accessible, comprising the steps of (a) causing a system management controlling portion to communicate with a host system, (b) causing a recording/reproducing portion to record and reproduce data to and from the record mediums, (c) causing a plurality of data controlling portions, disposed corresponding to a predetermined unit of data, to send the unit of data to the recording/reproducing portion in time slots of which a predetermined time period is divided into a plurality of portions and receiving data from the recording/reproducing portion, and (d) controlling the recording/reproducing portion, wherein when it is detected that data recorded on one of the record mediums is not reproduced, the step (c) is performed by causing the recording/reproducing portion to reproduce data and error correction data from reproducible record mediums in the time slots assigned by the system management controlling portion and restructuring data that is not reproduced with data that is reproduced from the reproducible record mediums and the error correction data.

A seventh aspect of the present invention is a data recording/reproducing method for recording and reproducing data to and from a plurality of record mediums that are non-linearly accessible, comprising the steps of (a) causing a recording/reproducing portion to record and reproduce data to and from the record mediums, (b) causing a plurality of data controlling portions, disposed corresponding to a predetermined unit of data, to send the unit of data to the recording/reproducing portion in time slots of which a predetermined time period is divided into a plurality of portions and receiving data from the recording/reproducing portion, and (c) controlling the recording/reproducing portion, wherein when it is detected that data recorded on one of the record mediums is not reproduced, the step (c) is performed by causing the recording/reproducing portion to reproduce data and error correction data from reproducible record mediums in a remaining time period of the time slots after the data controlling portion has completed a record control or a reproduction control to or from the record mediums and re-structuring data that is not reproduced with data that is reproduced from the reproducible record mediums and the error correction data.

An eighth aspect of the present invention is a data recording/reproducing method for recording and reproducing data to and from a plurality of record mediums that are non-linearly accessible, comprising the steps of (a) causing a recording/reproducing portion to record and reproduce data to and from the record mediums, (b) causing a plurality of data controlling portions, disposed corresponding to a predetermined unit of data, to send the unit of data to the recording/reproducing portion in time slots of which a predetermined time period is divided into a plurality of portions and receiving data from the recording/reproducing portion, and (c) controlling the recording/reproducing portion, wherein when it is detected that data recorded on one of the record mediums is not reproduced and that data received from the data controlling portions is not supplied to the recording/reproducing portion, the step (c) is performed by causing the recording/reproducing portion to reproduce data and error correction data from reproducible record mediums in the time slots assigned and re-structuring data that is not reproduced with data that is reproduced from the reproducible record mediums and the error correction data.

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENTS

Figure 4:
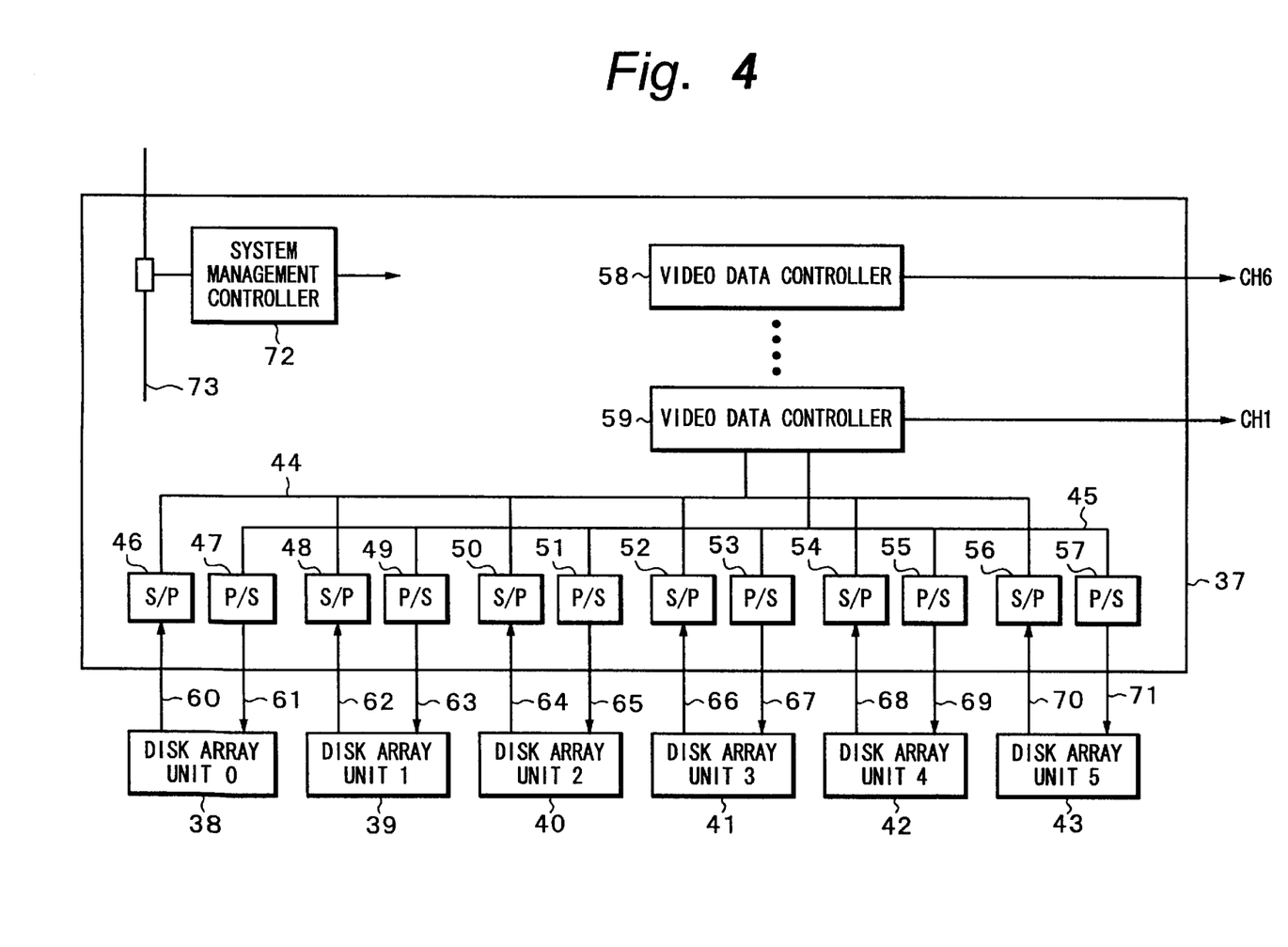
FIG. 4 is a block diagram showing a data recording/reproducing apparatus according to an embodiment of the present invention.

Next, with reference to the accompanying drawings, an embodiment of the present invention will be described. FIG. 4 shows an example of the structure of a data recording/reproducing apparatus having disk array units according to the present invention. The data recording/reproducing apparatus inputs/outputs high quality picture data on many channels (for example, channels 1 to 6). In FIG. 4, six disk array units 38, 39, 40, 41, 42, and 43 that have respective serial inputs and outputs are operated in parallel. Each of the disk array units 38, 39, 40, 41, 42, and 43 is composed of a plurality of data recording hard disks and one parity recording hard disk. The data recording/reproducing apparatus has six video controllers 58, . . . , and 59. Video data of one channel is input and output to and from these video controllers 58, and 59. In this embodiment, video data that is compressed corresponding to MPEG standard or the like is described. However, the present invention is not limited to such compressed data. In addition, the compressing method according to the present invention is not limited to the MPEG standard using inter-frame correlation. Instead, the present invention can be applied for data compressed corresponding to various compressing methods. In addition, serial/parallel (S/P) converters 46, 48, 50, 52, 54, and 56 and parallel/serial (P/S) converters 47, 49, 51, 53, 55, and 57 are disposed corresponding to the disk array units 38 to 43, respectively.

Serial outputs 60, 62, 64, 66, 68, and 70 of the disk array units 38 to 43 are connected to a high speed data bus 44 through the S/P converters 46, 48, 50, 52, 54, and 56, respectively. Serial inputs 61, 63, 65, 67, 69, and 71 of the disk array units 38 to 43 are connected to a high speed data bus 45 through the P/S converters 47, 49, 51, 53, 55, and 57, respectively. In addition, a system management controller 72 is disposed. The system management controller 72 communicates with a supervisor of a host system through a network 73. These video data controllers 58, . . . , and 59, the P/S converters 47, 49, 51, 53, 55, and 57, the S/P converters 46, 48, 50, 52, 54, and 56, and the system management controller 72 compose a data processing block 37. According to the embodiment of the present invention, the six disk array units 38 to 43 composes a recording/reproducing block.

As described above, the video data controllers 58, . . . , and 59 share independent 48-bit data buses 44 and 45. Video data received from the video data controllers 58, . . . , and 59 is supplied as 48-bit parallel data to the data bus 45 along with command data and so forth. The 48-bit parallel data is divided into eight-bit data on the data bus 45 and supplied to the P/S converters 47, . . . , and 57. Thereafter, the resultant serial data is supplied to the disk array units 38 to 43 through the serial transmission lines 61, . . . , and 71, respectively. Video data received from the disk array units 38 to 43 is supplied as serial data to the S/P converters 46, . . . , and 56 through the serial transmission lines 60, . . . , and 70 along with status data and so forth. After the video data is converted into eight-bit parallel data, it is combined to 48-bit parallel data. The resultant parallel data is supplied to the video data controllers 58, . . . , and 59 through the data bus 44.

Since the serial transmission lines 60, . . . , and 70 and the serial transmission lines 61, . . . , and 71 are independently disposed, the disk array units 38 to 43 can receive data from the respective serial transmission lines and send data to the respective serial transmission lines at a particular time.

Figure 5:
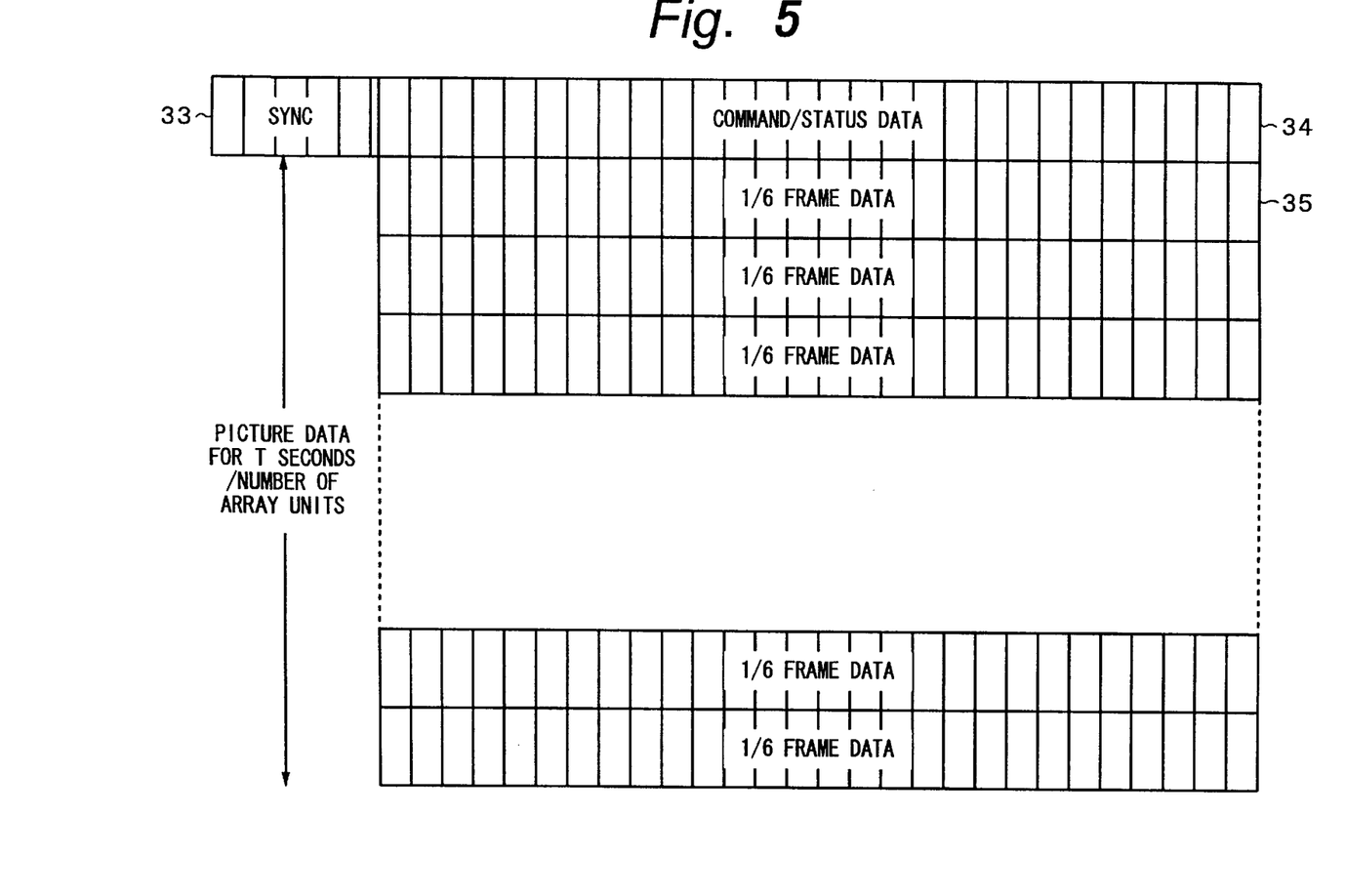
FIG. 5 is a schematic diagram showing a data format of serial data transmission according to the embodiment of the present invention.

FIG. 5 shows the format of data sent from the serial transmission lines 60, . . . , and 70 and serial transmission lines 61, . . . , and 71. A synchronous signal 33 is placed at the beginning of each data. The synchronous signal 33 is followed by a predetermined amount of command data or status data 35. The video data controllers 58, . . . , 59 place commands for the disk array units 38 to 43 in the command/status data 34. The disk array units 38 to 43 place statuses corresponding to commands or statuses of the disk array units 38 to 43 in the command/status data 34.

The command/status data 34 is followed by 1.01 sec (30 frame) video data 35. The video data 35 is equally divided by the number of the disk array units 38 to 43 (thus, six disk array units). The video data 35 is sent from the video data controllers 58, . . . , and 59 to the disk array units 38 to 43. Alternatively, the video data 35 is sent from the disk array units 38 to 43 to the video data controllers 58, . . . , 59.

Figure 6:
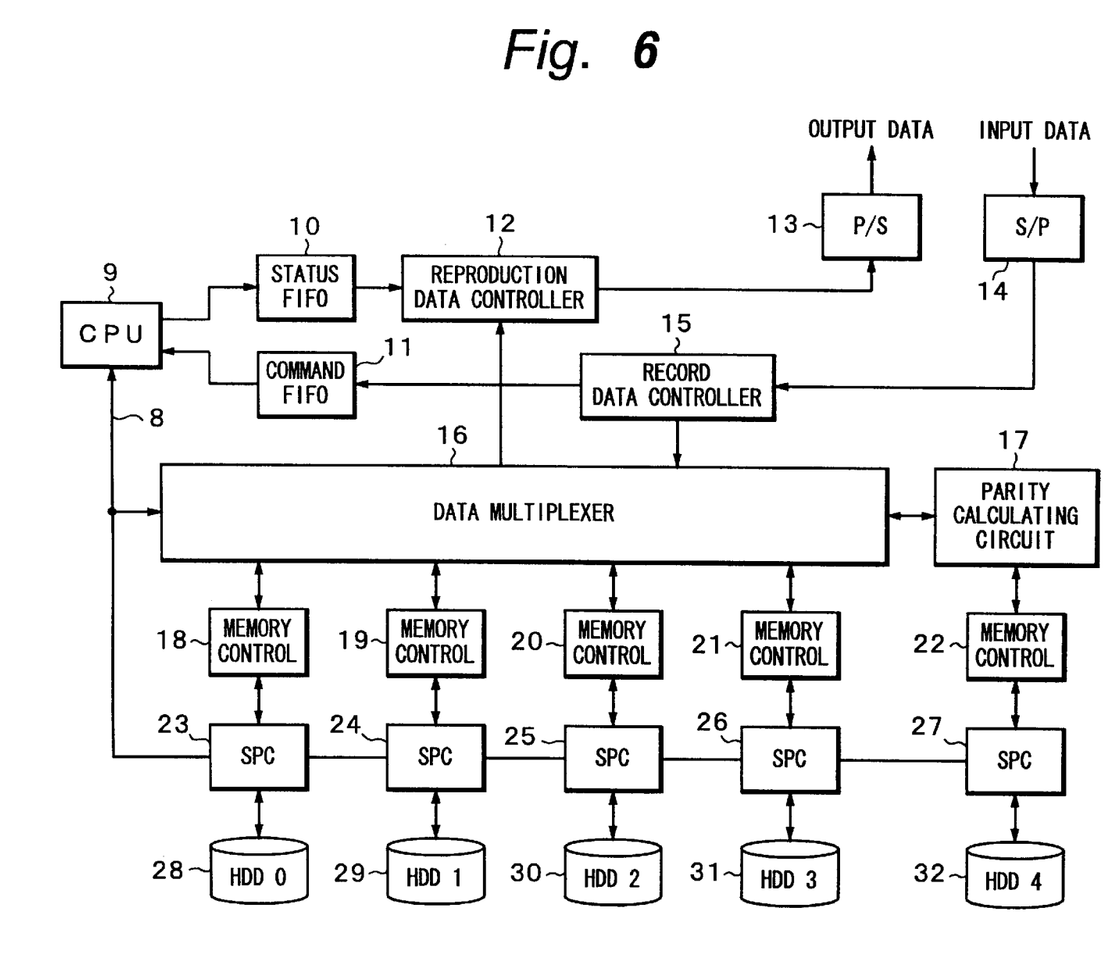
FIG. 6 is a block diagram showing an example of the structure of a disk array unit according to the embodiment of the present invention.

The disk array units 38 to 43 are structured as shown in FIG. 6. When data is recorded by a disk array unit according to the embodiment, data is supplied from a predetermined video data controller to an S/P converter 14 through a serial transmission line. The input data is composed of a synchronous signal, command data, and video data corresponding to the format shown in FIG. 5. The input data is converted into parallel data by the S/P converter 14 and then supplied to a record data controller 15. When the record data controller 15 detects a synchronous signal at the beginning of the input data, a predetermined amount of command data preceded by the synchronous signal is supplied to a command FIFO 11 and stored.

On the other hand, video data preceded by the command data is supplied from the record data controller 15 to the data multiplexer 16. The data multiplexer 16 is connected to memory controllers 18, 19, 20, and 21 and video data recording hard disks 28, 29, 30, and 31 through SCSI protocol controllers (SPC) 23, 24, 25, and 26. A parity calculating circuit 17 is also connected to the data multiplexer 16. The parity calculating circuit 17 is connected to a memory controller 22 and a parity data recording hard disk 32 through an SPC 27. The SPCs 23 to 27 are connected in series. One end of the SPCs 23 to 27 is connected to a CPU 9. The data multiplexer 16 distributes the video data. The distributed video data is recorded on the hard disks 28 to 31. At this point, parity data calculated by the parity calculating circuit 17 is recorded on the hard disk 32.

When the recording operation is normally completed, the CPU 9 issues status data representing that the recording operation has been normally completed. The status data is stored in a status FIFO 10. Thereafter, the status data is supplied to a reproduction data controller 12 at a predetermined timing. The reproduction data controller 12 generates a synchronous signal. The reproduction data controller 12 adds status data to the synchronous signal and supplies the resultant data to a P/S converter 13. The P/S converter 13 converts the synchronous signal and the status data into serial data and sends information representing that the recording operation has been completed to a relevant video data controller through a relevant serial transmission line.

When a disk array unit according to the embodiment reproduces data, a relevant video data controller supplies command data for the data to be reproduced through a relevant serial transmission line. Video data recorded on the hard disks 28 to 31 and parity data recorded on the hard disk 32 are read corresponding to the command data. The data multiplexer 16 combines the video data that are read from the hard disks 28 to 31 and 32. The resultant video data is supplied to the reproduction data controller 12. The CPU 9 generates status data corresponding to the reproducing operation. The status data is stored in the status FIFO 10. Thereafter, the status data is supplied to the reproduction data controller 12 at a predetermined timing. The reproduction data controller 12 generates a synchronous signal and adds status data and video data to the synchronous signal. The resultant data is supplied to the P/S converter 13. The P/S converter 13 converts the synchronous signal, status data, and video data into serial data and sends the resultant data through a relevant serial transmission line.

Figure 7:
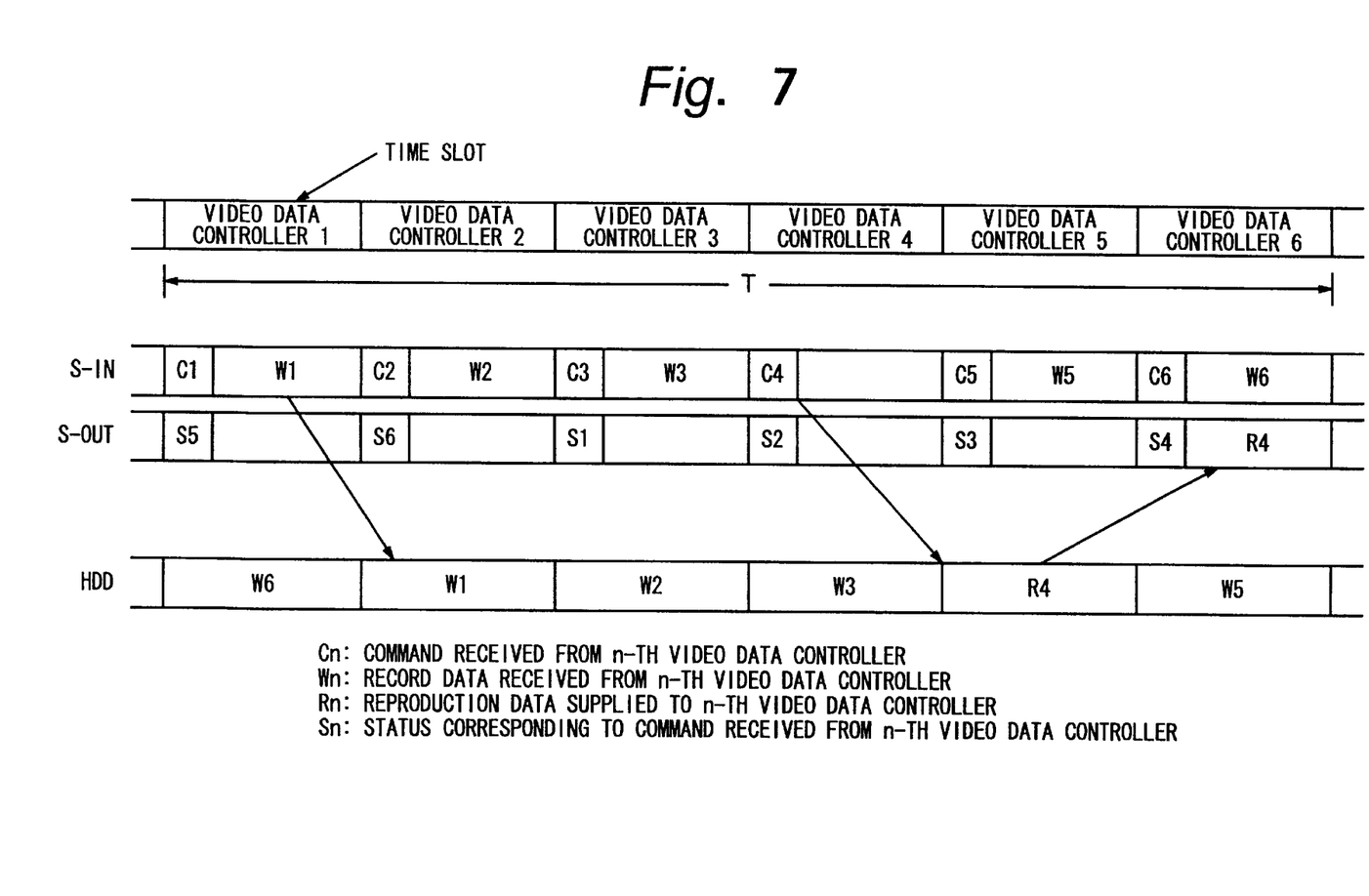
FIG. 7 is a timing chart showing an example of the operation of the embodiment of the present invention.

FIG. 7 is a schematic diagram showing timings of which the video data controllers 58, . . . , and 59 of the data recording/reproducing apparatus according to the embodiment of the present invention send data to the disk array units 38 to 43. As shown in FIG. 7, time period T (for example, 1.01 seconds for 30 frames of video data) is divided into time slots corresponding to the number of video data controllers being connected. The video data controllers are assigned to individual time slots. Thus, the disk array units 38 to 43 control the video data controllers 58, . . . , and 59 so that they do not record and reproduce data at the same time.

For example, when the video data controller 1 (six video controllers 58, . . . , and 59 are designated video controllers 1, 2, . . . , and 6) records video data, video data for 1.01 seconds (30 frames) stored in the memory is sent to the disk array units 38 to 43 through the respective serial transmission line S-IN (61, 63, . . . , and 71) with assigned time slots). At this point, video data W1 of which video data of 1.01 seconds that is equally divided by the number of disk array units (in this case, six disk array units) is preceded by the synchronous signal and the command C1 and sent through the respective serial transmission lines. The command C1 causes video data followed thereby to be recorded on hard disks of the disk array units 38 to 43.

In the disk array units 38 to 43, the S/P converter 14 converts input data into parallel data. In addition, the S/P converter 14 detects the SYNC signal 33 (see FIG. 5) at the beginning of the input data. The record data controller 15 selects the command C1 preceded by the SYNC signal 33 and stores the command C1 in the FIFO 11. The data multiplexer 16 distributes the video data W1 preceded by the command C1 to the hard disks 28 to 31. The parity data calculated by the parity calculating circuit 17 is recorded on the hard disk 32. When these operations have been normally completed, a status S1 that represents that these completions have been normally completed is added to the synchronous signal and sent to the video data controller 1 through the serial transmission lines S-OUT (60, 62, . . . , and 70).

When the video data controller issues a data reproduction command, data corresponding to the data reproduction command is read from the hard disks 28 to 31. Unlike with the recording operation, the data multiplexer 16 combines the data read from the hard disks 28 to 31. The combined data preceded by the SYNC signal 33 and the status data 34 is supplied to the P/S converter 13 through the reproduction data controller 12. Thereafter, the serial data is sent through transmission lines 60, 62, 64,66, 68, and 70.

For example, when the video data controller 4 reproduces video data R4 recorded in the disk array units 38 to 43, the video data controller 4 sends a command C4 that causes the disk array units 38 to 43 to reproduce the video data R4. Thus, the disk array units 38 to 43 read video data R4 distributively recorded on the hard disks 28 to 31. Unlike with the recording operation, the data multiplexer 16 combines data and adds the video data R4 to the synchronous signal and the status S4. The resultant data is sent through the reproduction data controller 12, the P/S converter 13, and the serial transmission line S-OUT. The data that is output from the serial transmission line S-OUT is sent to the S/P converters 46, 48, . . . , and 56. The S/P converters 46, 48, . . . , and 56 convert input data into parallel data and sends the resultant data to the video data controller 4.

In the above-described structure, since a command and data are simultaneously sent in a fixed format, the interface circuit is simply structured. Video data, command, and status are exchanged between the video data controllers 58, . . . , and 59 and the disk array units 38 to 43 with the above-described time slots. Thus, a mediation operation for preventing a plurality of controllers from issuing commands at the same time or a particular controller from massively issuing commands is not required. In addition, the system can be simply controlled. Moreover, since the system operates in a predetermined schedule, blank time of the disk array units can be managed.

According to the embodiment of the present invention, the blank time is detected and the amount of data to be re-constructed is determined. The re-structuring operation is divisionally performed. Thus, data can be re-structured with the deterioration of the function minimally suppressed. The data re-structuring operation re-calculates original data with the remaining data and records the re-structured data to a hard disk that has lost such data. Thus, a total time period (Xa+Xb+Xc+Xd) is required for calculating re-structured data (where Xa is a time period for which a hard disk seeks the remaining data; Xb is a time period for which the data is read; Xc is a time period for which the parity calculating circuit 17 calculates the re-structured data; and Xd is a time period for which a status is sent to an SPC). In addition, the re-structured data should be stored in the memory controllers 18 to 22. The data should be recorded on the hard disks to be re-structured. For example, when data is re-structured on the hard disk 31, the re-structured data is stored in the memory controller 21. Thereafter, the data is recorded on the hard disk 31 in the remaining time period.

Figure 8:
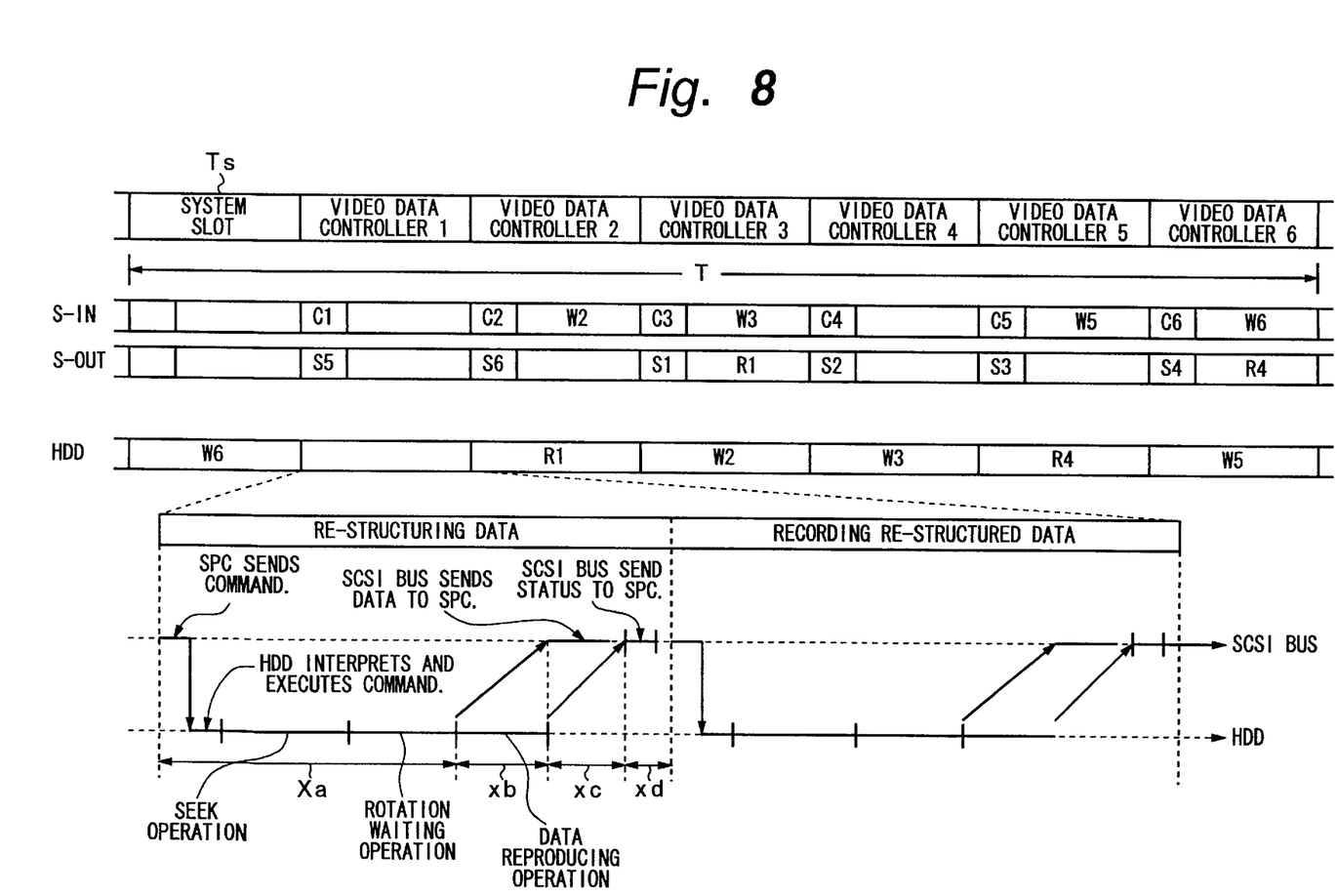
FIG. 8 is a timing chart showing a first example of the data re-structuring operation.
Figure 9:
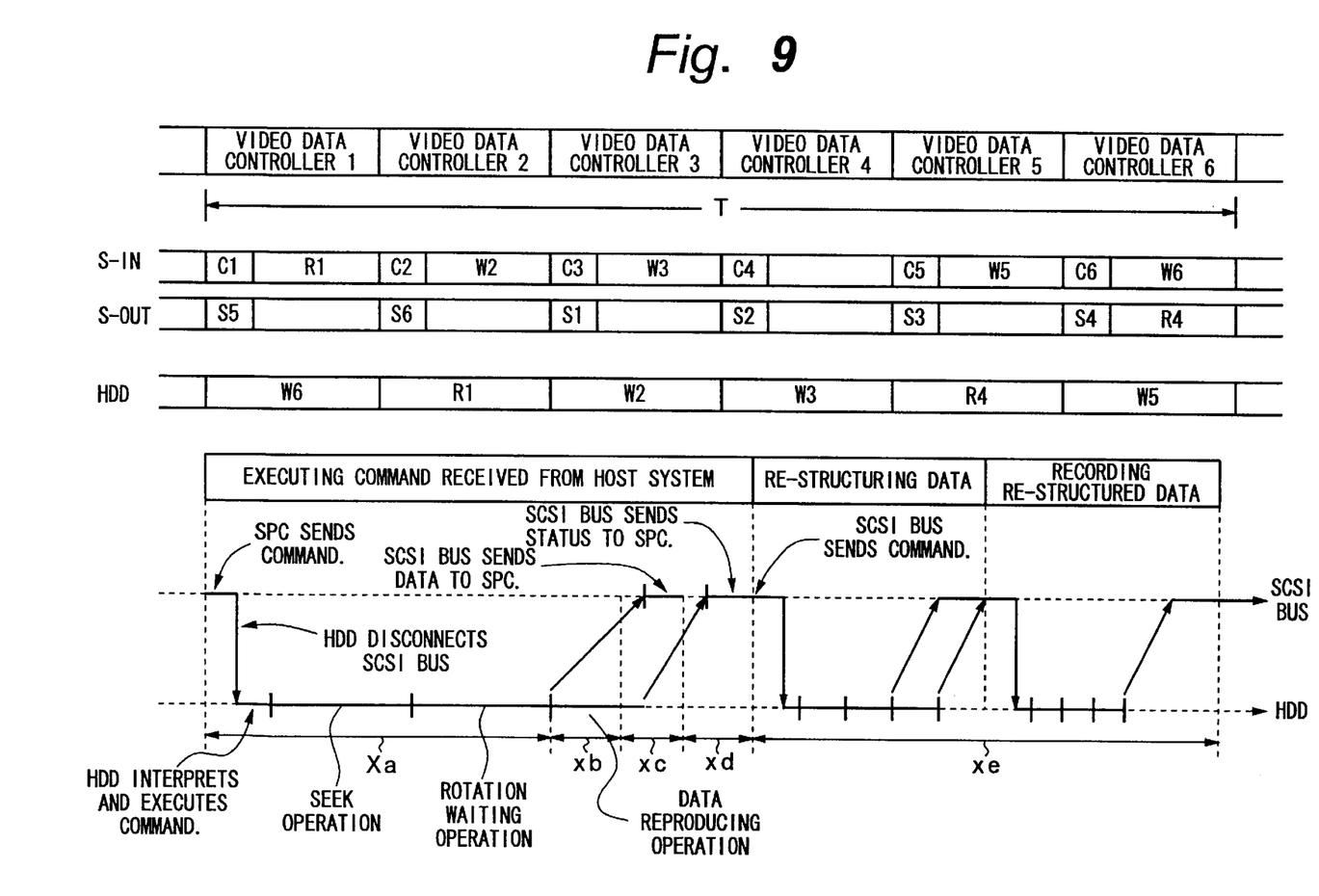
FIG. 9 is a timing chart showing a second example of the data re-structuring operation.
Figure 10:
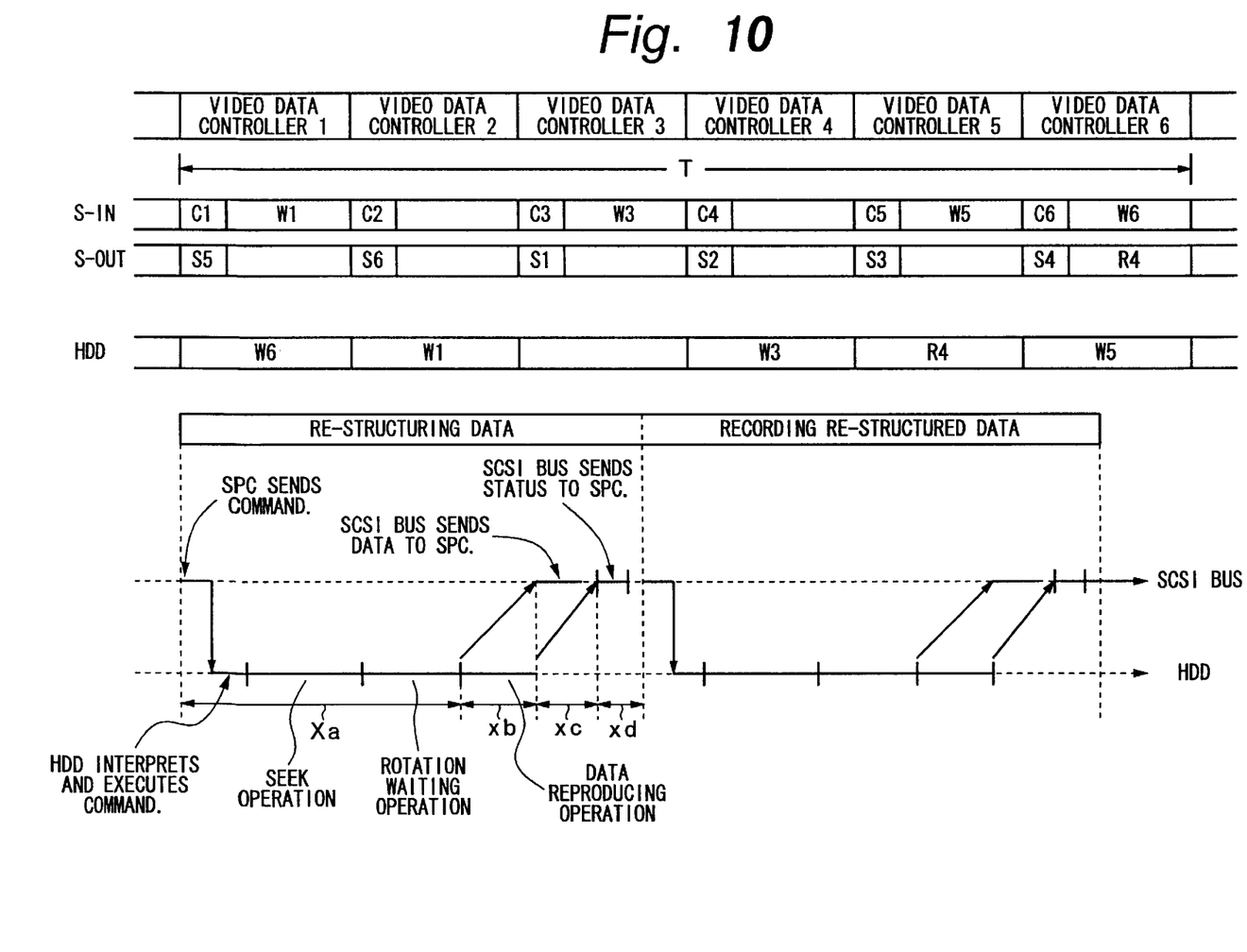
FIG. 10 is a timing chart showing a third example of the data re-structuring operation.

FIGS. 8, 9, and 10 show examples of timings of first to third re-structuring operations of data according to the present invention. These timing charts show the operations of the hard disks 28 to 32 and the statuses of the SCSI buses disposed between the hard disks 28 to 32 and the SPCs 23 to 27. In the first example shown in FIG. 8, the data re-structuring operation is performed with time slots Ts for the system management controller 72. The time slots Ts are placed at predetermined intervals. With the time slots Ts, the data re-structuring operation and the recording operation of the re-structured data are performed.

When the hard disk 31 gets defective, the SPC 26 and the hard disk 31 cannot communicate with each other. The CPU 9 detects this situation and disconnects the hard disk 31. As shown in FIG. 8, the SPCs 23, 24, 25, and 27 send commands to the hard disks 28, 29, 30, and 32, respectively. The hard disks 28, 29, 30, and 32 interpret and execute the commands. Thereafter, the hard disks 28, 29, 30, and 32 seek data and wait for rotations thereof. It takes the time period Xa for the hard disks 28, 29, 30, and 32 to seek the data. In the next time period Xb, data is reproduced. In the time period Xc, the reproduced data is supplied to the SPCs 23, 24, 25, and 27. In the time period Xc, the parity calculating circuit 17 calculates parity data. In the next time period Xd, a status is sent to the SPCs 23, 24, 25, and 27. In the time period (Xa+Xb+Xc+Xd), data is re-structured.

Next, the re-structured data is recorded on the hard disk 31. As with the data re-structuring operation, the recording operation is performed with a sequence of which the command send operation from the SPC 26 to the hard disk 31, the seek operation, the rotation waiting operation, the data recording operation, the data sending operation to the SPC 26, and the status sending operation to the SPC 26.

In the method of which the time slot for the system is used (see FIG. 8), data can be re-structured while a data record/reproduction command is received without a sacrifice of deterioration of the performance of each video controller. In this case, when a system slot is present and a management command is not received from the host system, data is re-structured in the time period of one time slot. The CPU 9 manages a blank time period and automatically re-structures data in a time slot for the system that satisfies the above-described condition. Thus, the time necessary for re-structuring data of all region of a defective hard disk is reduced.

In the second example shown in FIG. 9, after a command received from the host system (in reality, a video data controller) has been executed in one time slot, data is re-structured in the remaining time period Xe. When each hard disk sends the status that represents that the operation has been completed to the SPCs 23 to 27, the CPU 9 of the disk array calculates the remaining time period Xe of the time slot. The CPU 9 calculates the amount of data that can be re-structured in the remaining time period Xe and executes the re-structuring operation. This calculation is performed with the remaining time period, data transmission rate and access time period. As with the first example, data is re-structured and the re-structured data is recorded. The CPU 9 manages the blank time period and automatically performs the re-structuring operation.

In the third example shown in FIG. 10, the CPU 9 of a disk array unit detects the situation of which a command is not received from the video data controller in an assigned time slot. In addition, the CPU 9 calculates the amount of data that can be re-structured in the time slot and re-structures the data. This calculation is performed with the amount of data that can be accessed in one time slot and the time period therefor. As with the time slot for the system, the amount of data that can be accessed in one time slot can be designated as a predetermined data amount. In addition, as with the first and second examples, in the blank time period, the CPU 9 automatically performs the re-structuring operation.

One embodiment according to the present invention has been described in detail. However, it should be noted that the present invention is not limited to the above-described embodiment. In other words, various modifications can be performed corresponding to the technology of the present invention. For example, data that is recorded and reproduced may be data composed of video data and audio data. In addition, the error correction redundancy data may be error correction code other than parity data.

As described above, according to the present invention, in a recording/reproducing apparatus having a plurality of disk arrays that are operated in parallel with high reliability and high transmission rate of data that is recorded and reproduced, as a data transmission system., an interface that can simultaneously sends data and command between a data processing block and a disk array unit and of which a plurality of transmission lines synchronously operate is used. The entire apparatus operates with a predetermined schedule. When a hard disk of a disk array gets defective and a data re-structuring operation is required, even if the data processing block a synchronously issues data record/reproduction command, the re-structuring operation can be performed without a sacrifice of deterioration of the performance.

According to the present invention, when a blank time period of other than a time slot for the system is calculated and the data re-structuring operation is performed for the amount of data corresponding to the blank time period, the time period necessary for the re-structuring operation can be reduced.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A data recording/reproducing apparatus for recording and reproducing data to and from a plurality of redundant disk arrays that are accessible in parallel, said apparatus having means for reconstructing in real-time corrupted data caused by an error in recording or reproducing the data, comprising:

a recording/reproducing portion for recording and reproducing data to and from said plurality of redundant disk arrays; each disk array being comprised of a plurality of record mediums; said recording/reproducing portion having a plurality of data controllers connected in parallel to said plurality of redundant disk arrays through a parallel data input bus and a parallel data output bus; each of said plurality of data controllers being operable to input and output continuous real-time data;

error detection means for detecting corrupted data caused by an error in recording or reproducing the data; said error detection means identifying a specific record medium wherein said error occurred; and reconstruction means for reconstructing in real-time the data which was corrupted; said reconstruction means including a controlling portion for controlling said recording/reproducing portion, wherein when said error detection means detects corrupted data, said controlling portion detects a blank time period for which a host system has not accessed the data recording/ reproducing apparatus; said reconstruction means causes said recording/reproducing portion to reconstruct the data in said blank time period from the redundant disk arrays and from error correction data recorded on another record medium.

2. The data recording/reproducing apparatus as set forth in claim 1, wherein the record mediums are hard disks.

3. The data recording/reproducing apparatus as set forth in claim 2, wherein a hard disk on which the error correction data has been recorded is different from hard disks on which the data has been recorded.

4. The data recording/reproducing apparatus as set forth in claim 1, wherein the data is picture data and/or sound data.

5. The data recording/reproducing apparatus as set forth in claim 1, wherein said controlling portion controls said recording/reproducing portion so that the reconstructed data is recorded on the record medium where the error occurred.

6. The data recording/reproducing apparatus as set forth in claim 1, wherein said controlling portion controls said recording/reproducing portion so that said recording/ reproducing portion records the reconstructed data to a record medium other than the record medium where the error occurred.

7. A data recording/reproducing apparatus for recording and reproducing data to and from a plurality of redundant disk arrays that are accessible in parallel, said apparatus having means for reconstructing in real-time corrupted data caused by an error in recording or reproducing the data, comprising:

a system management controlling portion communicable with a host system;

a recording/reproducing portion for recording and reproducing data to and from said plurality of redundant disk arrays; each disk array being comprised of a plurality of record mediums;

a plurality of data controlling portions controlled by said system management controlling portion and connected in parallel to said plurality of redundant disk arrays through a parallel data input bus and a parallel data output bus, for sending units of continuous real-time data to said recording/reproducing portion in time slots which are divided into a plurality of time periods and for receiving continuous real-time data from said recording/reproducing portion;

error detection means for detecting corrupted data caused by an error in recording or reproducing the data; said error detection means identifying a specific record medium wherein said error occurred; and reconstruction means for reconstructing in real-time the data which was corrupted; said reconstruction means including a controlling portion for controlling said recording/reproducing portion, wherein when said error detection means detects corrupted data, said reconstruction means causes said recording/ reproducing portion to reconstruct the data in the time slots assigned by said system management controlling portion from the redundant disk arrays and from error correction data recorded on another record medium.

8. The data recording/reproducing apparatus as set forth in claim 7, wherein the record mediums are hard disks, the hard disks being operated in parallel, the record mediums being structured as a disk array.

9. The data recording/reproducing apparatus as set forth in claim 8, wherein a hard disk on which the error correction data has been recorded is different from hard disks on which the data has been recorded.

10. The data recording/reproducing apparatus as set forth in claim 7, wherein the data is picture data and/or sound data.

11. The data recording/reproducing apparatus as set forth in claim 7, wherein said controlling portion controls said recording/reproducing portion so that the reconstructed data is recorded on the record medium where the error occurred.

12. The data recording/reproducing apparatus as set forth in claim 7, wherein said controlling portion controls said recording/reproducing portion so that said recording/ reproducing portion records the reconstructed data to a record medium other than the record medium where the error occurred.

13. A data recording/reproducing apparatus for recording and reproducing data to and from a plurality of redundant disk arrays that are accessible in parallel, said apparatus having means for reconstructing in real-time corrupted data caused by an error in recording or reproducing the data, comprising:

a recording/reproducing portion for recording and reproducing data to and from said plurality of redundant disk arrays; each disk array being comprised of a plurality of record mediums; each disk array having a parallel-to-serial data converter and a serial-to-parallel data converter for converting input parallel data to serial data and output serial data to parallel data, respectively;

a plurality of data controlling portions controlled by said system management controlling portion and connected in parallel to said plurality of redundant disk arrays through a parallel data input bus and a parallel data output bus, for sending units of continuous real-time data to said recording/reproducing portion in time slots which are divided into a plurality of time periods and for receiving continuous real-time data from said recording/reproducing portion;

error detection means for detecting corrupted data caused by an error in recording or reproducing the data; said error detection means identifying a specific record medium wherein said error occurred; and reconstruction means for reconstructing in real-time the data which was corrupted; said reconstruction means including a controlling portion for controlling said recording/reproducing portion, wherein when said error detection means detects corrupted data, said reconstruction means causes said recording/reproducing portion to reconstruct the data from the redundant disk arrays and from error correction data recorded on another record medium in the remaining time periods of the time slot following the sending and receipt of data by said data controlling portion.

14. The data recording/reproducing apparatus as set forth in claim 13, wherein the record mediums are hard disks, the hard disks being operated in parallel, the record mediums being structured as a disk array.

15. The data recording/reproducing apparatus as set forth in claim 14,
wherein a hard disk on which the error correction data has been recorded is different from hard disks on which the data has been recorded.

16. The data recording/reproducing apparatus as set forth in claim 13,
wherein the data is picture data and/or sound data.

17. The data recording/reproducing apparatus as set forth in claim 13, wherein said controlling portion controls said recording/reproducing portion so that the reconstructed data is recorded on the record medium where the error occurred.

18. The data recording/reproducing apparatus as set forth in claim 13, wherein said controlling portion controls said recording/reproducing portion so that said recording/reproducing portion records the reconstructed data to a record medium other than the record medium where the error occurred.

19. A data recording/reproducing apparatus for recording and reproducing data to and from a plurality of redundant disk arrays that are accessible in parallel, said apparatus having means for reconstructing in real-time corrupted data caused by an error in recording or reproducing the data, comprising:

a recording/reproducing portion for recording and reproducing data to and from said plurality of redundant disk arrays; each disk array being comprised of a plurality of record mediums; each disk array having a parallel-to-serial data converter and a serial-to-parallel data converter for converting input parallel data to serial data and output serial data to parallel data, respectively;

a plurality of data controlling portions controlled by said system management controlling portion and connected in parallel to said plurality of redundant disk arrays through a parallel data input bus and a parallel data output bus, for sending units of continuous real-time data to said recording/reproducing portion in time slots which are divided into a plurality of time periods and for receiving continuous real-time data from said recording/reproducing portion;

error detection means for detecting corrupted data caused by an error in recording or reproducing the data; said error detection means identifying a specific record medium wherein said error occurred; and reconstruction means for reconstructing in real-time the data which was corrupted; said reconstruction means including a controlling portion for controlling said recording/reproducing portion, wherein when said error detection means detects corrupted data, said reconstruction means causes said recording/reproducing portion to reconstruct the data from the redundant disk arrays and from error correction data recorded on another record medium in the time slots assigned.

20. The data recording/reproducing apparatus as set forth in claim 19, wherein the record mediums are hard disks, the hard disks being operated in parallel, the record mediums being structured as a disk array.

21. The data recording/reproducing apparatus as set forth in claim 20,
wherein a hard disk on which the error correction data has been recorded is different from hard disks on which the data has been recorded.

22. The data recording/reproducing apparatus as set forth in claim 19,
wherein the data is picture data and/or sound data.

23. The data recording/reproducing apparatus as set forth in claim 19, wherein said controlling portion controls said recording/reproducing portion so that the reconstructed data is recorded on the record medium where the error occurred.

24. The data recording/reproducing apparatus as set forth in claim 19, wherein said controlling portion controls said recording/reproducing portion so that said recording/reproducing portion records the reconstructed data to a record medium other than the record medium where the error occurred.

25. A data recording/reproducing method for recording and reproducing data to and from a plurality of redundant disk arrays that are accessible in parallel, said apparatus having means for reconstructing in real-time corrupted data caused by an error in recording or reproducing the data, comprising the steps of:

(a) causing a recording/reproducing portion to record and reproduce data to and from said plurality of redundant disk arrays; each disk array being comprised of a plurality of record mediums; said recording/reproducing portion having a plurality of data controllers connected in parallel to said plurality of redundant disk arrays through a parallel data input bus and a parallel data output bus; each of said plurality of data controllers being operable to input and output continuous real-time data;

(b) detecting corrupted data caused by an error in recording or reproducing the data and identifying a specific record medium wherein said error occurred; and (c) reconstructing in real-time the data which was corrupted by controlling the recording/reproducing portion, wherein when corrupted data is detected the controlling portion detects a blank time period for which a host system has not accessed the data recording/reproducing apparatus; said reconstruction step causing the recording/reproducing portion to reconstruct the data in said blank time period from the redundant disk arrays and from error correction data recorded on another record medium.

26. The data recording/reproducing apparatus as set forth in claim 25, wherein the record mediums are hard disks.

27. The data recording/reproducing method as set forth in claim 26,
wherein a hard disk on which the error correction data has been recorded is different from hard disks on which the data has been recorded.

28. The data recording/reproducing method as set forth in claim 25,
wherein the data is picture data and/or sound data.

29. The data recording/reproducing method as set forth in claim 25, wherein the step (c) is performed by controlling said recording/reproducing portion so that the reconstructed data is recorded on the record medium where the error occurred.

30. The data recording/reproducing method as set forth in claim 25, wherein the step (c) is performed by controlling said recording/reproducing portion so that said recording/reproducing portion records the reconstructed data to a record medium other than the record medium where the error occurred.

31. A data recording/reproducing method for recording and reproducing data to and from a plurality of redundant disk arrays that are accessible in parallel, said apparatus having means for reconstructing in real-time corrupted data caused by an error in recording or reproducing the data, comprising the steps of:

(a) causing a system management controlling portion to communicate with a host system;

(b) causing a recording/reproducing portion to record and reproduce data to and from said plurality of redundant disk arrays; each disk array being comprised of a plurality of record mediums;

(c) causing a plurality of data controlling portions controlled by said system management controlling portion and connected in parallel to said plurality of redundant disk arrays through a parallel data input bus and a parallel data output bus, to send units of continuous real-time data to the recording/reproducing portion in time slots which are divided into a plurality of time periods and receiving continuous real-time data from said recording/reproducing portion;

(d) detecting corrupted data caused by an error in recording or reproducing the data and identifying a specific record medium wherein said error occurred; and (e) reconstructing in real-time the data which was corrupted by controlling the recording/reproducing portion, wherein when corrupted data is detected data reconstruction is performed by causing the recording/reproducing portion to reconstruct the data in the time slots assigned by said system management controlling portion from the redundant disk arrays and from error correction data recorded on another record medium.

32. The data recording/reproducing method as set forth in claim 31, wherein the record mediums are hard disks, the hard disks being operated in parallel, the record mediums being structured as a disk array.

33. The data recording/reproducing method as set forth in claim 32,
wherein a hard disk on which the error correction data has been recorded is different from hard disks on which the data has been recorded.

34. The data recording/reproducing method as set forth in claim 31,
wherein the data is picture data and/or sound data.

35. The data recording/reproducing method as set forth in claim 31, wherein the step (e) is performed by controlling said recording/reproducing portion so that the reconstructed data is recorded on the record medium where the error occurred.

36. The data recording/reproducing method as set forth in claim 31, wherein the step (e) is performed by controlling said recording/reproducing portion so that said recording/reproducing portion records the reconstructed data to a record medium other than the record medium where the error occurred.

37. A data recording/reproducing method for recording and reproducing data to and from a plurality of redundant disk arrays that are accessible in parallel, said apparatus having means for reconstructing in real-time corrupted data caused by an error in recording or reproducing the data, comprising the steps of:

(a) causing a recording/reproducing portion to record and reproduce data to and from said plurality of redundant disk arrays; each disk array being comprised of a plurality of record mediums; each disk array having a parallel-to-serial data converter and a serial-to-parallel data converter for converting input parallel data to serial data and output serial data to parallel data, respectively;

(b) causing a plurality of data controlling portions controlled by said system management controlling portion and connected in parallel to said plurality of redundant disk arrays through a parallel data input bus and a parallel data output bus, to send units of continuous real-time data to the recording/reproducing portion in time slots which are divided into a plurality of time periods and receiving continuous real-time data from said recording/reproducing portion;

(c) detecting corrupted data caused by an error in recording or reproducing the data and identifying a specific record medium wherein said error occurred; and (d) reconstructing in real-time the data which was corrupted by controlling the recording/reproducing portion, wherein when corrupted data is detected data reconstruction is performed by causing the recording/reproducing portion to reconstruct the data from the redundant disk arrays and from error correction data recorded on another record medium in the remaining time periods of the time slot following the sending and receipt of data by said data controlling portion.

38. The data recording/reproducing method as set forth in claim 37, wherein the record mediums are hard disks, the hard disks being operated in parallel, the record mediums being structured as a disk array.

39. The data recording/reproducing method as set forth in claim 38,
wherein a hard disk on which the error correction data has been recorded is different from hard disks on which the data has been recorded.

40. The data recording/reproducing method as set forth in claim 37,
wherein the data is picture data and/or sound date.

41. The data recording/reproducing method as set forth in claim 37, wherein the step (d) is performed by controlling said recording/reproducing portion so that the reconstructed data is recorded on the record medium where the error occurred.

42. The data recording/reproducing method as set forth in claim 37, wherein the step (d) is performed by controlling said recording/reproducing portion so that said recording/reproducing portion records the reconstructed data to a record medium other than the record medium where the error occurred.

43. A data recording/reproducing method for recording and reproducing data to and from a plurality of redundant disk arrays that are accessible in parallel, said apparatus having means for reconstructing in real-time corrupted data caused by an error in recording or reproducing the data, comprising the steps of:

(a) causing a recording/reproducing portion to record and reproduce data to and from said plurality of redundant disk arrays; each disk array being comprised of a plurality of record mediums; each disk array having a parallel-to-serial data converter and a serial-to-parallel data converter for converting input parallel data to serial data and output serial data to parallel data, respectively;

(b) causing a plurality of data controlling portions controlled by said system management controlling portion and connected in parallel to said plurality of redundant disk arrays through a parallel data input bus and a parallel data output bus, to send units of continuous real-time data to the recording/reproducing portion in time slots which are divided into a plurality of time periods and receiving continuous real-time data from said recording/reproducing portion;

(c) detecting corrupted data caused by an error in recording or reproducing the data and identifying a specific record medium wherein said error occurred; and (d) reconstructing in real-time the data which was corrupted by controlling the recording/reproducing portion, wherein when corrupted data is detected data reconstruction is performed by causing the recording/reproducing portion to reconstruct the data from the redundant disk arrays and from error correction data recorded on another record medium in the time slots assigned.

44. The data recording/reproducing method as set forth in claim 43, wherein the record mediums are hard disks, the hard disks being operated in parallel, the record mediums being structured as a disk array.

45. The data recording/reproducing method as set forth in claim 44, wherein a hard disk on which the error correction data has been recorded is different from hard disks on which the data has been recorded.

46. The data recording/reproducing method as set forth in claim 43, wherein the data is picture data and/or sound data.

47. The data recording/reproducing method as set forth in claim 43, wherein the step (d) is performed by controlling said recording/reproducing portion so that the reconstructed data is recorded on the record medium where the error occurred.

48. The data recording/reproducing method as set forth in claim 43, wherein the step (d) is performed by controlling said recording/reproducing portion so that said recording/reproducing portion records the reconstructed data to a record medium other than the record medium where the error occurred.

* * * * *